US012059945B2

(12) United States Patent
Keon et al.

(10) Patent No.: US 12,059,945 B2
(45) Date of Patent: Aug. 13, 2024

(54) HEAT EXCHANGER AND VEHICLE AIR CONDITIONING SYSTEM

(71) Applicant: Hanon Systems, Daejeon (KR)

(72) Inventors: Dae Bok Keon, Daejeon (KR); Semin Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 470 days.

(21) Appl. No.: 17/433,905

(22) PCT Filed: Feb. 21, 2020

(86) PCT No.: PCT/KR2020/002511
§ 371 (c)(1),
(2) Date: Aug. 25, 2021

(87) PCT Pub. No.: WO2020/175854
PCT Pub. Date: Sep. 3, 2020

(65) Prior Publication Data
US 2022/0134845 A1 May 5, 2022

(30) Foreign Application Priority Data

Feb. 25, 2019 (KR) .................. 10-2019-0021800
Feb. 25, 2019 (KR) .................. 10-2019-0021842

(51) Int. Cl.
*B60H 1/32* (2006.01)
*B60H 1/00* (2006.01)
(Continued)

(52) U.S. Cl.
CPC ....... *B60H 1/3227* (2013.01); *B60H 1/00278* (2013.01); *B60H 1/00328* (2013.01);
(Continued)

(58) Field of Classification Search
CPC .......... F28D 1/05391; F28D 2021/0091; F28F 1/022; F28F 2250/102; F28F 9/0246; B60H 1/00885
See application file for complete search history.

(56) References Cited

U.S. PATENT DOCUMENTS 5,086,835 A * 2/1992 Shinmura ............. F28F 9/0246
123/41.51
10,760,824 B2 * 9/2020 Akaiwa .................. F28F 1/128
(Continued)

FOREIGN PATENT DOCUMENTS

DE 102017205744 A1 10/2018
JP 2000130986 A 5/2000
(Continued)

OTHER PUBLICATIONS

International Search Report issued in PCT/KR2020/002511 on May 27, 2020.
(Continued)

*Primary Examiner* — Lionel Nouketcha
(74) *Attorney, Agent, or Firm* — Norton Rose Fulbright US LLP; James R. Crawford

(57) ABSTRACT

A vehicle air conditioning system provides a heat exchanger and a vehicle air conditioning system comprising same, which can simplify the overall structure and can easily perform cooling/heating of air for air conditioning and dehumidification heating by using an integrated heat exchanger which is selectively supplied with low- and high-temperature cooling water by a supply valve to perform heat exchange.

32 Claims, 19 Drawing Sheets

(51) Int. Cl.
  *B60H 1/22* (2006.01)
  *F28F 1/12* (2006.01)
  *F28F 9/02* (2006.01)
  *F28F 9/26* (2006.01)

(52) U.S. Cl.
  CPC ....... *B60H 1/00885* (2013.01); *B60H 1/2221* (2013.01); *B60H 1/3233* (2013.01); *F28F 1/126* (2013.01); *F28F 9/0214* (2013.01); *F28F 9/0246* (2013.01); *F28F 9/262* (2013.01)

(56) References Cited

U.S. PATENT DOCUMENTS

| | | | |
|---|---|---|---|
| 2011/0220336 A1* | 9/2011 | Saito | F28F 9/0217 165/173 |
| 2014/0311702 A1* | 10/2014 | Takagi | F28F 9/028 165/41 |
| 2016/0298912 A9 | 10/2016 | Kadle et al. | |

FOREIGN PATENT DOCUMENTS

| | | |
|---|---|---|
| JP | 2002031369 A | 1/2002 |
| JP | 2003211935 A | 7/2003 |
| JP | 2012145311 A | 8/2012 |
| JP | 2013113572 A | 6/2013 |
| JP | 2017110898 A | 6/2017 |
| JP | 6167892 B2 | 7/2017 |
| KR | 20020007830 A | 1/2002 |
| KR | 100378054 B1 | 3/2003 |
| KR | 20070081635 A | 8/2007 |
| KR | 20110115208 A | 10/2011 |

OTHER PUBLICATIONS

Examination Report issued on Dec. 1, 2023 by the German PTO in the corresponding Patent Application No. DE 11 2020 000 923.8 , with English translation.

* cited by examiner

FIRST HEAT EXCHANGE UNIT    SECOND HEAT EXCHANGE UNIT

HEAT EXCHANGER AND VEHICLE AIR CONDITIONING SYSTEM

CROSS REFERENCE TO RELATED APPLICATIONS

This application is a national phase under 35 U.S.C. § 371 of International Application No. PCT/KR2020/002511 filed on Feb. 21, 2020, which claims the benefit of priority from Korean Patent Application Nos. 10-2019-0021800 filed on Feb. 25, 2019 and 10-2019-0021842 filed on Feb. 25, 2019. The entire contents of these applications are incorporated herein by reference in their entirety.

TECHNICAL FIELD

The present invention relates to a vehicle air conditioning system. More specifically, the present invention provides a heat exchanger capable of easily cooling or heating air for air conditioning or performing dehumidification heating, while having a simplified overall configuration, by using a heat exchanger including a supply value through which a low-temperature or high-temperature coolant is selectively supplied to exchange heat, and a vehicle air conditioning system including the same.

BACKGROUND ART

In general, a heat exchanger is a device installed on a specific flow path to exchange heat in such a way that a heat exchange medium circulating therein absorbs external heat or the heat exchanger radiates its own heat to the outside.

Such heat exchangers are manufactured in various ways depending on the purpose of use and the application, such as condensers and evaporators using refrigerants as heat exchange mediums, radiators and heater cores using coolants as heat exchange mediums, and oil coolers using oils as heat exchange mediums to cool the oils flowing in engines, transmissions, and the like.

Recently, in the automobile industry, as the interest in environment and energy increases worldwide, research is being conducted to improve fuel efficiency. In order to satisfy the needs of various consumers, research and development for weight reduction, size reduction, and high functionality are continuously being carried out.

However, in connection with heat exchangers used in automobiles, in a case where a plurality of heat exchangers are separately manufactured and installed, a large number of manufacturing steps are required, resulting in not only low productivity but also severe material waste, thereby increasing costs. In addition, there has been difficulty in securing a space for mounting each of the heat exchangers. In order to solve this problem, various technologies for integrally forming the plurality of heat exchangers have been developed and used.

As a related art, Korean Patent Laid-Open Publication No. 10-2007-0081635 discloses a heat exchanger. FIG. 1 is a diagram illustrating a conventional heat exchanger.

As illustrated, the conventional heat exchanger includes: a first core part 10 including a plurality of first tubes 11 through which a first fluid flows, first heat radiation fins 12 interposed between the first tubes 11, and first headers 13 coupled to both ends of the first tubes 11, respectively; a second core part 20 including a plurality of second tubes 21 through which a second fluid flows, second heat radiation fins 22 interposed between the second tubes 21, and second headers 23 coupled to both ends of the second tubes 21, respectively; a single tank 30 coupled to both the first header 13 and the second header 23 of the first core part 10 and the second core part 20, which are arranged in a vertical direction, to form a space in which the first and second fluids flow; and at least one baffle 60 provided inside the tank 30 to separate the first fluid and the second fluid from each other. As described above, in the conventional heat exchanger, the single tank 30 is partitioned by the baffle 60 inside so that the two heat exchange mediums can be cooled at the same time.

In such a heat exchanger, however, two heat exchange mediums having different temperatures circulate in one tank partitioned by the baffle 60. In this case, since the two areas partitioned by the baffle 60 are not changed, there is a problem in that the heat exchanger needs to be designed to have a size in which the maximum cooling capacity can be ensured in both the two areas to cool each of the heat exchange mediums in accordance with various vehicle environments. That is, there is a problem in that the entire size of the heat exchanger is inevitably large, otherwise the cooling performance of the heat exchange mediums inevitably deteriorates.

RELATED ART DOCUMENT

Patent Document

KR 10-2007-0081635 A (Aug. 17, 2007)

DISCLOSURE

Technical Problem

An object of the present invention is to provide a heat exchanger capable of easily cooling or heating air for air conditioning or performing dehumidification heating, while having a simplified overall configuration, by exchanging heat using a supply value through which a low-temperature or high-temperature coolant is selectively supplied, and a vehicle air conditioning system including the same.

Particularly, an object of the present invention is to provide a heat exchanger including a supply value through which only a first heat exchange medium having a low temperature can be supplied to perform cooling, only a second heat exchange medium having a high temperature can be supplied to perform heating, or both the first heat exchange medium and the second heat exchange medium can be supplied to perform dehumidification cooling, and a vehicle air conditioning system including the same.

Further, an object of the present invention is to provide a heat exchanger with a first header tank located on a lower side thereof and including an assembly including a 1-1st header and a 1-1st tank, which form a 1-1st area, and an assembly including a 1-2nd header and a 1-2nd tank, which form a 1-2nd area, the 1-1st area and the 1-2nd area being spaced apart from each other at a predetermined distance to easily drain condensed water generated on a surface, and a vehicle air conditioning system including the same.

Further, an object of the present invention is to provide a heat exchanger including a first heat exchange unit with no fins in a direction in which air for air conditioning flows and a second heat exchange unit with fins interposed between second tubes to further increase drainage of condensed water while having sufficient heat exchange performance, and a vehicle air conditioning system including the same.

In addition, an object of the present invention is to provide a heat exchanger capable of air-conditioning the interior of a vehicle even in a simple structure in which a single heat exchanger is provided in an air conditioning case, and a vehicle air conditioning system including the same.

Further, an object of the present invention is to provide a heat exchanger capable of easily cooling or heating air for air conditioning or performing dehumidification heating, while having a simplified overall configuration, by using a heat exchanger including a supply value through which a low-temperature or high-temperature coolant is selectively supplied to exchange heat, and a vehicle air conditioning system including the same.

Particularly, an object of the present invention is to provide a heat exchanger including a supply value through which only a first heat exchange medium having a low temperature can be supplied to perform cooling, only a second heat exchange medium having a high temperature can be supplied to perform heating, or both the first heat exchange medium and the second heat exchange medium can be supplied to perform dehumidification cooling, and a battery module and an electric component can be selectively cooled or heated, and a vehicle air conditioning system including the same.

Technical Solution

In one general aspect, a heat exchanger H includes: a header tank 100 or 200 partitioned into a plurality of areas inside; and a supply valve 800 for supplying a plurality of introduced heat exchange mediums into the plurality of areas of the header tank 100 or 200, respectively, or supplying at least two heat exchange mediums into one of the plurality of areas of the header tank 100 or 200.

In another general aspect, a heat exchanger H includes: a first header tank 100 partitioned into a 1-1st area A101 and a 1-2nd area A102 inside; a second header tank 200 spaced apart from the first header tank 100 at a predetermined distance in parallel; first tubes 500 and second tubes 600 each having both ends fixed to the first header tank 100 and the second header tank 200, respectively, the first tubes 500 communicating with the 1-1st area A101 and the second tubes 600 communicating with the 1-2nd area A102; and a supply valve 800 regulating flows of a first heat exchange medium and a second heat exchange medium to be introduced for supply to the 1-1st area A101 and the 1-2nd area A102.

In addition, the heat exchanger may further include: a first inlet pipe 310 provided between the 1-1st area A101 of the first header tank 100 and the supply valve 800; and a second inlet pipe 320 provided between the 1-2nd area A102 of the first header tank 100 and the supply valve 800.

In this case, through the supply valve 800, the first heat exchange medium may be supplied to both the first inlet pipe 310 and the second inlet pipe 320, the second heat exchange medium may be supplied to both the first inlet pipe 310 and the second inlet pipe 320, or the first heat exchange medium and the second heat exchange medium may be supplied to the first inlet pipe 310 and the second inlet pipe 320, respectively.

In addition, the first heat exchange medium and the second heat exchange medium may be coolants that are mixable with each other, while having different temperatures.

In addition, the first header tank 100 may include a 1-1st header 111 and a 1-1st tank 121 forming the 1-1st area A101, and a 1-2nd header 112 and a 1-2nd tank 122 forming the 1-2nd area A102. In this case, an assembly including the 1-1st header 111 and the 1-1st tank 121 and an assembly including the 1-2nd header 112 and the 1-2nd tank 122 may be spaced apart from each other at a predetermined distance.

Furthermore, the first header tank 100 may include a first header 110, and a 1-1st tank 121 and a 1-2nd tank 122 coupled to the first header 110.

In addition, the first header tank 100 may be hollowed in a predetermined area thereof between first tube insertion holes 110a into which the first tubes 500 and the second tubes 600 are inserted to form drainage holes 110b through which condensed water generated on a surface is drained.

In addition, the heat exchanger H may further include an outlet pipe 400 through which the first heat exchange medium or the second heat exchange medium flowing through the first tubes 500 and the second tubes 600 is discharged.

Furthermore, the second header tank 200 may be partitioned by a baffle 230 inside, such that the second header tank 200 includes a 2-1st area A201 communicating with the first tubes 500 and a 2-2nd area A202 communicating with the second tubes 600. In this case, the outlet pipe 400 may include a first outlet pipe 410 communicating with the 1-1st area A101 or the 2-1st area A201, and a second outlet pipe 420 communicating with the 1-2nd area A102 or the 2-2nd area A202.

In addition, the heat exchanger H may further include fins 700 interposed between the second tubes 600.

In another general aspect, a vehicle air conditioning system S includes: a refrigerant loop including a condenser 2200 and an evaporator 2400; and a heat exchanger H in which one or both of a first heat exchange medium and a second heat exchange medium selectively flow, the first heat exchange medium being cooled by exchanging heat with a refrigerant through the evaporator 2400 for indoor cooling, and the second heat exchange medium being heated by exchanging heat with the refrigerant through the condenser 2200 for indoor heating.

In addition, the heat exchanger H may include: a first heat exchange unit and a second heat exchange unit; a first inlet pipe 310 connected to the first heat exchange unit; a second inlet pipe 320 connected to the second heat exchange unit; and a supply valve 800 regulating flows of the first heat exchange medium and the second heat exchange medium supplied through the first inlet pipe 310 and the second inlet pipe 320.

In this case, through the supply valve 800, the first heat exchange medium may be supplied to both the first inlet pipe 310 and the second inlet pipe 320, the second heat exchange medium may be supplied to both the first inlet pipe 310 and the second inlet pipe 320, or the first heat exchange medium and the second heat exchange medium may be supplied to the first inlet pipe 310 and the second inlet pipe 320, respectively. The first heat exchange medium and the second heat exchange medium may be coolants that are mixable with each other, while having different temperatures.

In the vehicle air conditioning system S, the first heat exchange medium and the second heat exchange medium may be transferred along a coolant circulation line 1000, and the refrigerant loop may circulate a compressor 2100, the condenser 2200, an expansion means 2300, and the evaporator 2400 along a refrigerant circulation line 2000.

In addition, the refrigerant loop may include an air-cooled condenser 2600.

In this case, the vehicle air conditioning system S may further include: a first regulation valve 1510 provided on the coolant circulation line 1000 between the evaporator 2400 and the supply valve 800 to regulate a flow of a coolant; and a second regulation valve 1520 provided on the refrigerant circulation line 2000 between the condenser 2200 and the supply valve 800 to regulate the flow of the coolant.

In addition, the vehicle air conditioning system S may further include a battery module 1200 provided on the coolant circulation line 1000, and the second heat exchange medium may be heated by the battery module 1200.

In addition, the vehicle air conditioning system S may further include a third regulation valve 1530 provided on the coolant circulation line 1000 between the battery module 1200 and the evaporator 2400 to regulate the flow of the coolant.

Furthermore, the vehicle air conditioning system S may further include an electric component 1300 provided on the coolant circulation line 1000, and the second heat exchange medium may be heated by the electric component 1300.

In addition, the vehicle air conditioning system S may further include a radiator 1100.

In addition, the vehicle air conditioning system S may further include a bypass line 1600 connecting the first regulation valve 1510 to the coolant circulation line 1000, so that the coolant passing through the evaporator 2400 is bypassed without passing through the integrated heat exchange medium.

In addition, the heat exchanger H may include: a first header tank 100 partitioned into a 1-1st area A101 and a 1-2nd area A102 inside; a second header tank 200 spaced apart from the first header tank 100 at a predetermined distance in parallel; first tubes 500 and second tubes 600 each having both ends fixed to the first header tank 100 and the second header tank 200, respectively, the first tubes 500 communicating with the 1-1st area A101 and the second tubes 600 communicating with the 1-2nd area A102; a first inlet pipe 310 connected to the 1-1st area A101 of the first header tank 100; and a second inlet pipe 320 connected to the 1-2nd area A102 of the first header tank 100.

In the vehicle air conditioning system S, an assembly including the 1-1st header 111 and the 1-1st tank 121 and an assembly including the 1-2nd header 112 and the 1-2nd tank 122 may be spaced apart from each other at a predetermined distance.

Furthermore, the heat exchanger H may include an outlet pipe 400 through which the first heat exchange medium or the second heat exchange medium flowing through the first tubes 500 and the second tubes 600 is discharged.

Advanageous Effects

Accordingly, the heat exchanger and the vehicle air conditioning system including the same according to the present invention are advantageous in that a low-temperature or high-temperature coolant can be selectively supplied through the supply value to exchange heat, thereby easily cooling or heating air for air conditioning or performing dehumidification heating, while simplifying an overall configuration.

Particularly, the heat exchanger and the vehicle air conditioning system including the same according to the present invention are advantageous in that, through the supply value, only the first heat exchange medium having a low temperature can be supplied to perform cooling, only the second heat exchange medium having a high temperature can be supplied to perform heating, or both the first heat exchange medium and the second heat exchange medium can be supplied to perform dehumidification cooling.

In addition, the heat exchanger and the vehicle air conditioning system including the same according to the present invention are advantageous in that the first header tank is located on a lower side of the heat exchanger, and includes an assembly including a 1-1st header and a 1-1st tank, which form the 1-1st area, and an assembly including a 1-2nd header and a 1-2nd tank, which form the 1-2nd area, the 1-1st area and the 1-2nd area being spaced apart from each other at a predetermined distance, thereby easily draining condensed water generated on the surface.

In addition, the heat exchanger and the vehicle air conditioning system including the same according to the present invention are advantageous in that the first heat exchange unit is provided with no fins in the direction in which air for air conditioning flows and the second heat exchange unit is provided with fins interposed between the second tubes, thereby further increasing drainage of condensed water while having sufficient heat exchange performance.

Furthermore, the heat exchanger and the vehicle air conditioning system including the same according to the present invention are advantageous in that the interior of the vehicle can be air-conditioned even in a simple structure in which a single heat exchanger is provided in the air conditioning case.

Particularly, the vehicle air conditioning system according to the present invention is advantageous in that, through the supply value, only the first heat exchange medium having a low temperature can be supplied to perform cooling, only the second heat exchange medium having a high temperature can be supplied to perform heating, or both the first heat exchange medium and the second heat exchange medium can be supplied to perform dehumidification cooling, and the battery module and the electric component can be selectively cooled or heated.

DESCRIPTION OF REFERENCE NUMERALS

Figure 1:
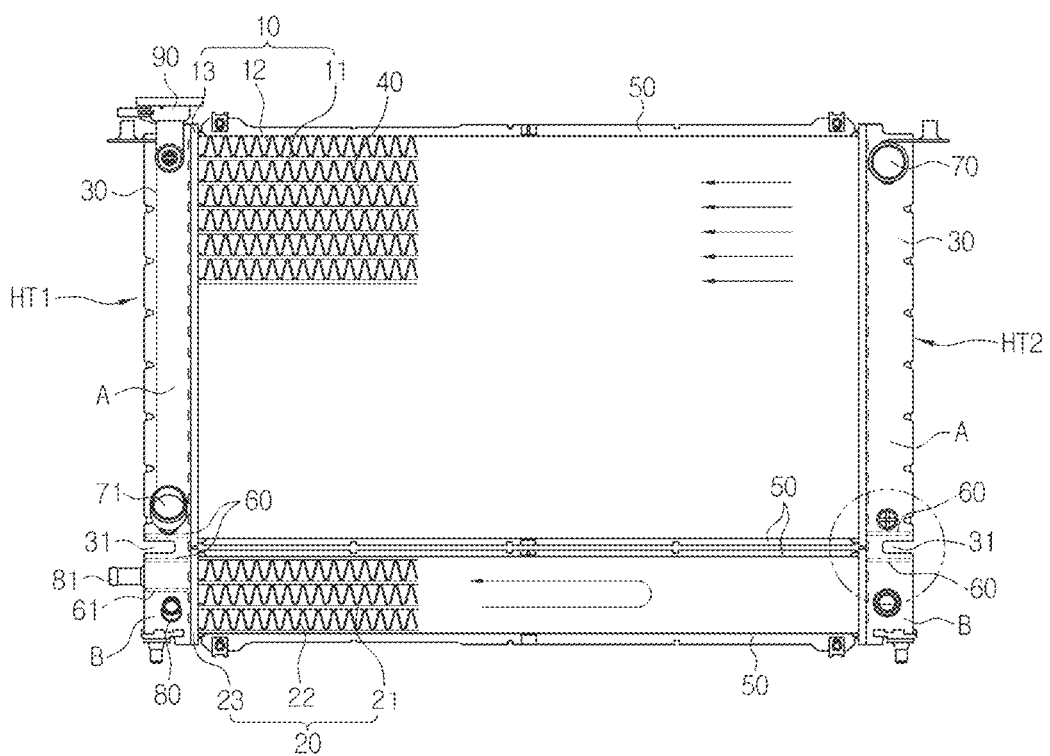
FIG. 1 is a diagram illustrating a conventional heat exchanger.

S: vehicle air conditioning system
H: heat exchanger
100: first header tank
A101: 1-1st area A102: 1-2nd area
110: first header 111: 1-1st header 112: 1-2nd header
121: 1-1st tank
122: 1-2nd tank
110a: first tube insertion hole
110b: drainage hole
200: second header tank
A200: second area
A201: 2-1st area A202: 2-2nd area
210: second header
220: second tank
230: baffle
210a: second tube insertion hole
310: first inlet pipe 320: second inlet pipe
400: outlet pipe
410: first outlet pipe 420: second outlet pipe
500: first tube
600: second tube
700: fin
800: supply valve
1000: coolant circulation line
1100: radiator
1200: battery module
1300: electric component
1400: heater core
1510: first regulation valve
1520: second regulation valve
1530: third regulation valve
1600: bypass line
2000: refrigerant circulation line
2100: compressor
2200: condenser
2300: expansion means
2400: evaporator
2500: internal heat exchanger
2600: air-cooled condenser
3000: blowing unit
4000: air conditioning case

BEST MODE

Hereinafter, a heat exchanger H and a vehicle air conditioning system S of the present invention having the above-described configuration will be described in detail with reference to the accompanying drawings.

Figure 2:
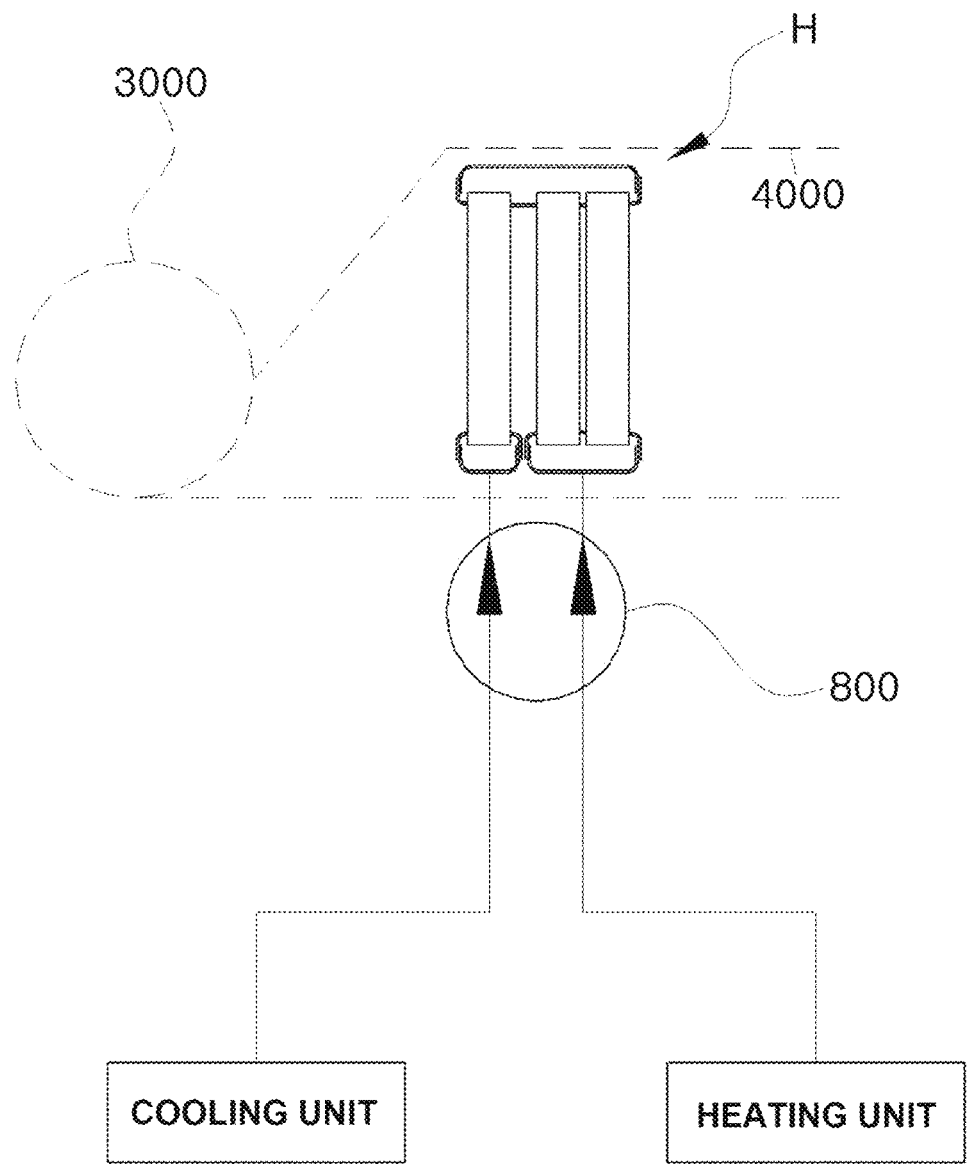
FIG. 2 is a schematic diagram illustrating a vehicle air conditioning system of the present invention.
Figure 3:
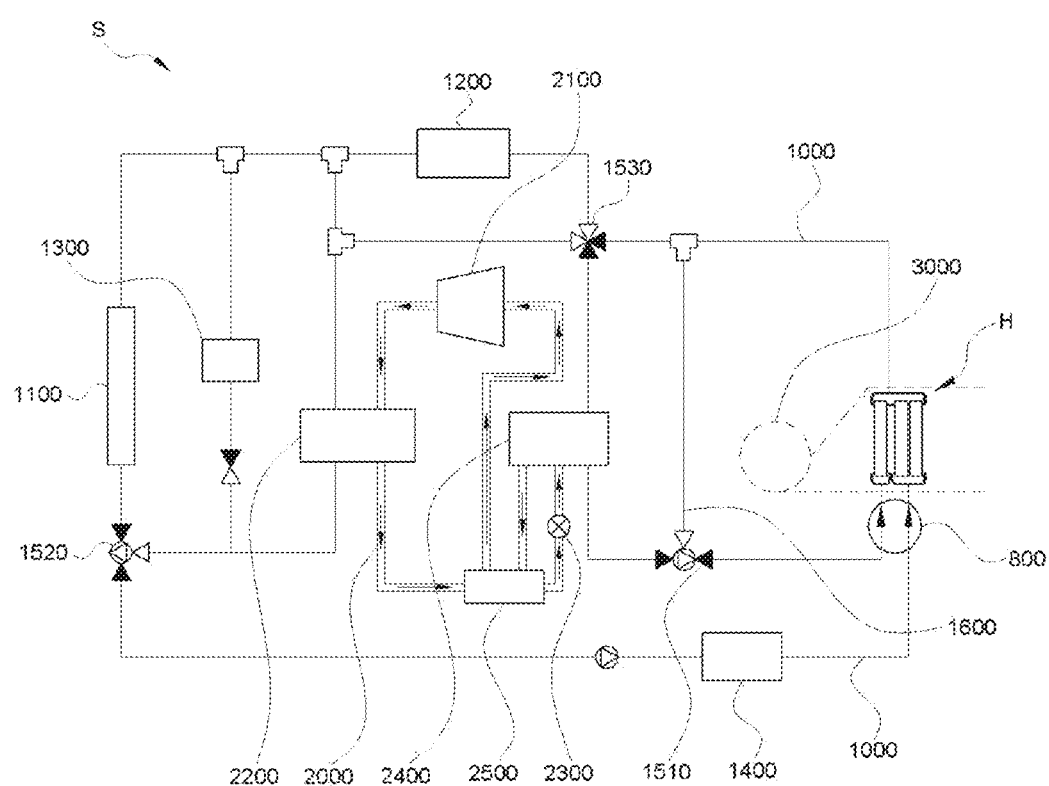
FIG. 3 is a system diagram illustrating the vehicle air conditioning system of the present invention.
Figure 4:
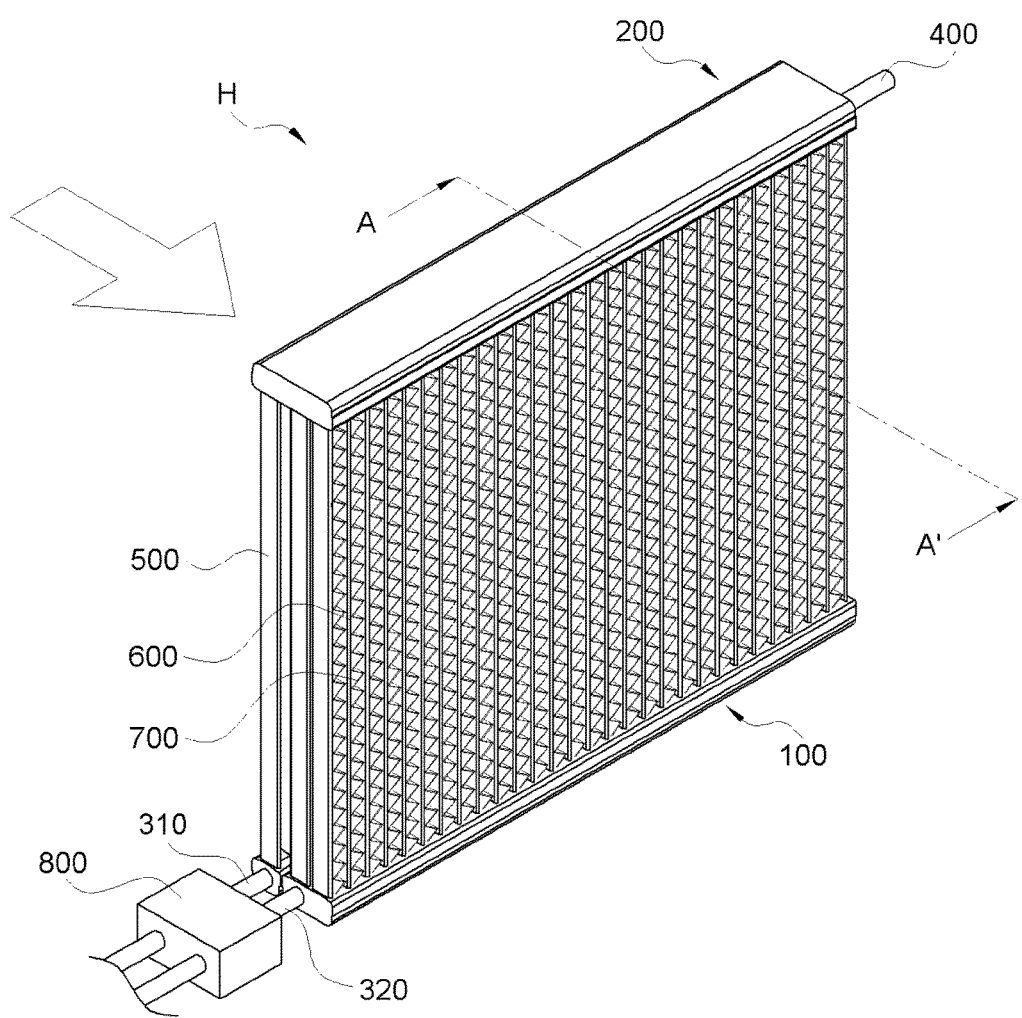
FIGS. 4 and 5 are a perspective view and a cross-sectional view in an AA' direction of a heat exchanger of the present invention, respectively.
Figure 5:
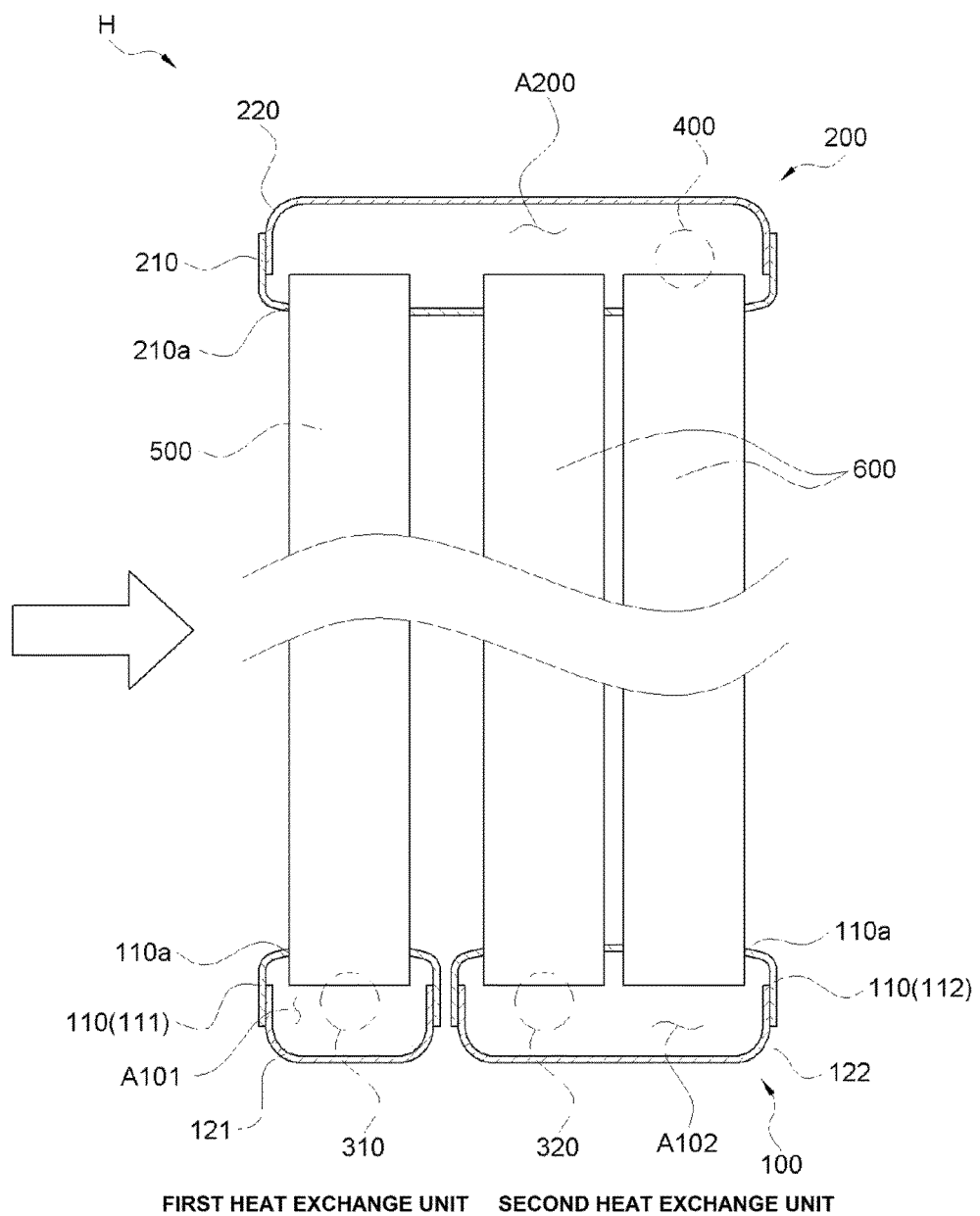
Figure 6:
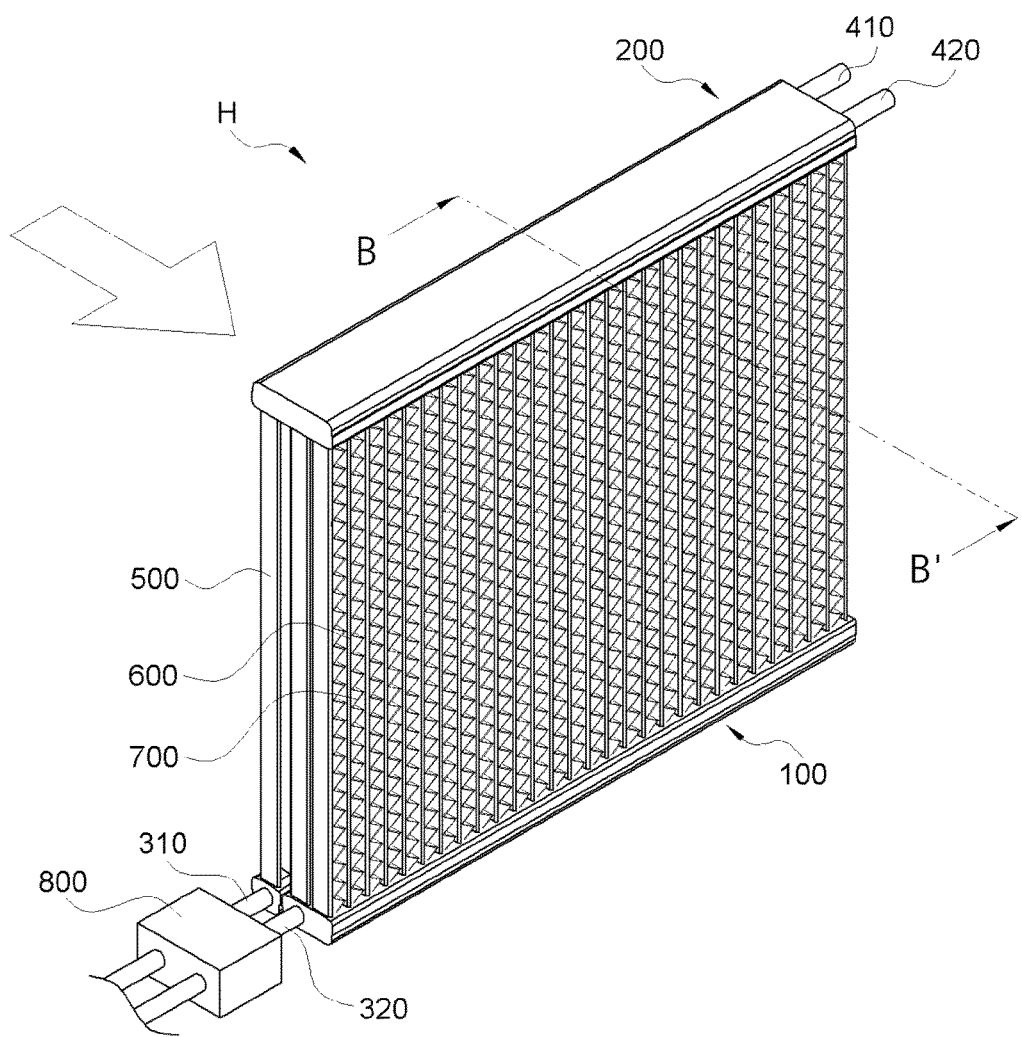
FIGS. 6 and 7 are another perspective view and a cross-sectional view in a BB' direction of the heat exchanger of the present invention, respectively.
Figure 7:
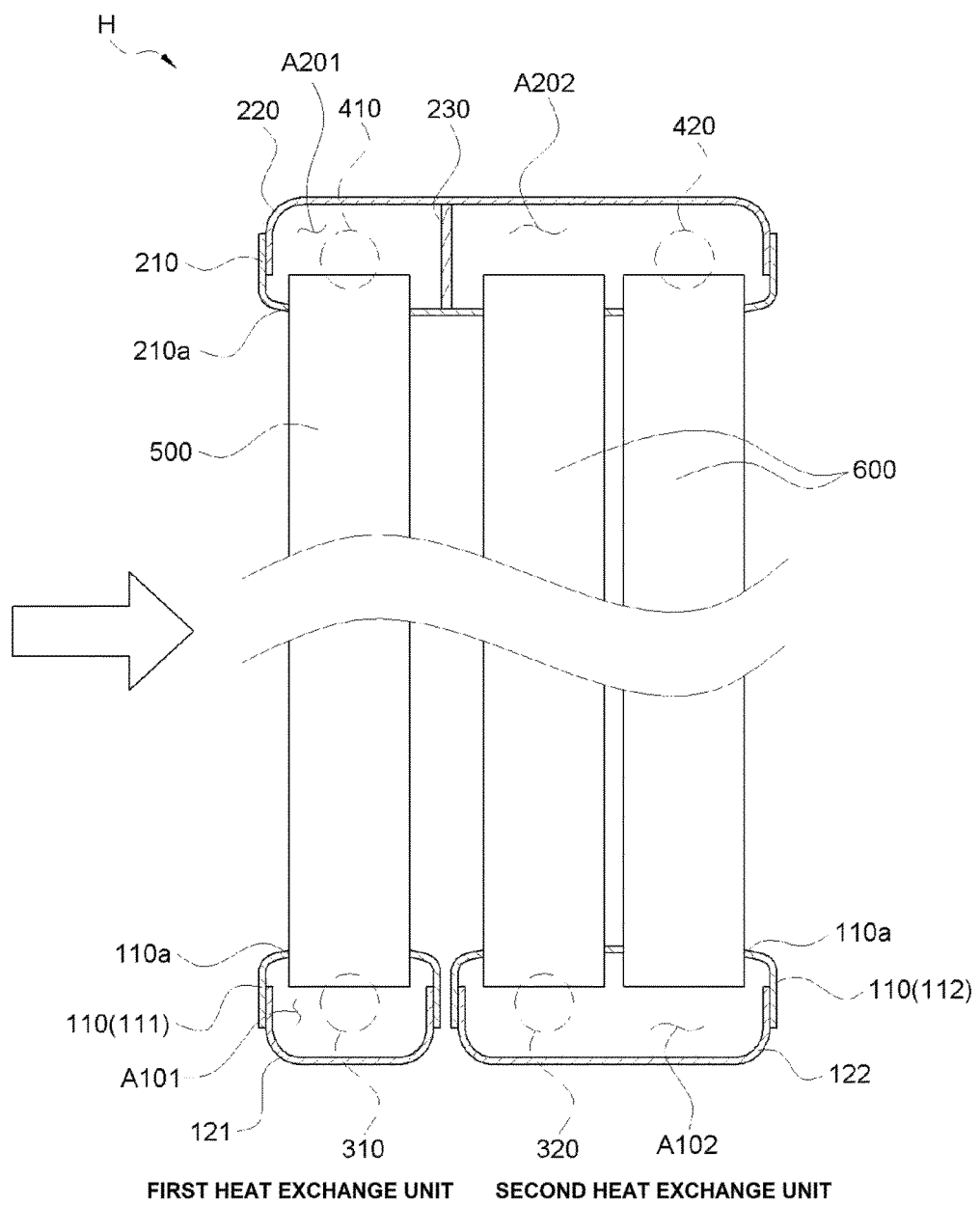
Figure 8:
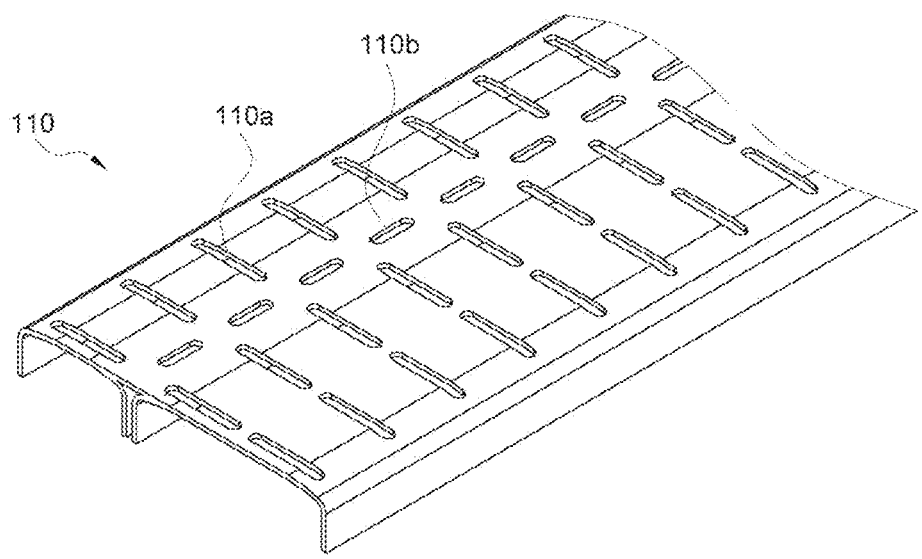
FIGS. 8 and 9 are a perspective view and a partial cross-sectional view illustrating an example of a first header of the heat exchanger of the present invention, respectively.
Figure 9:
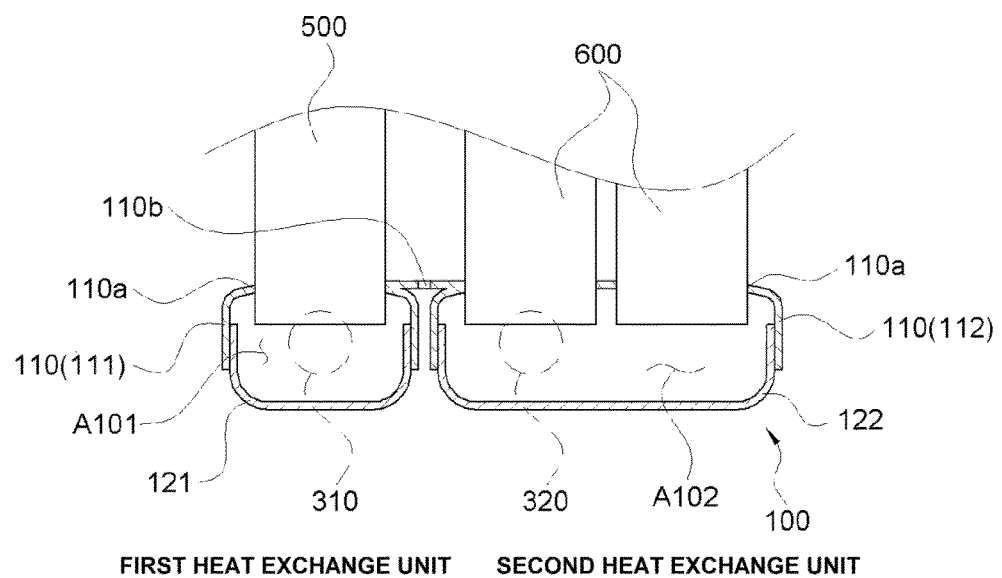
Figure 10:
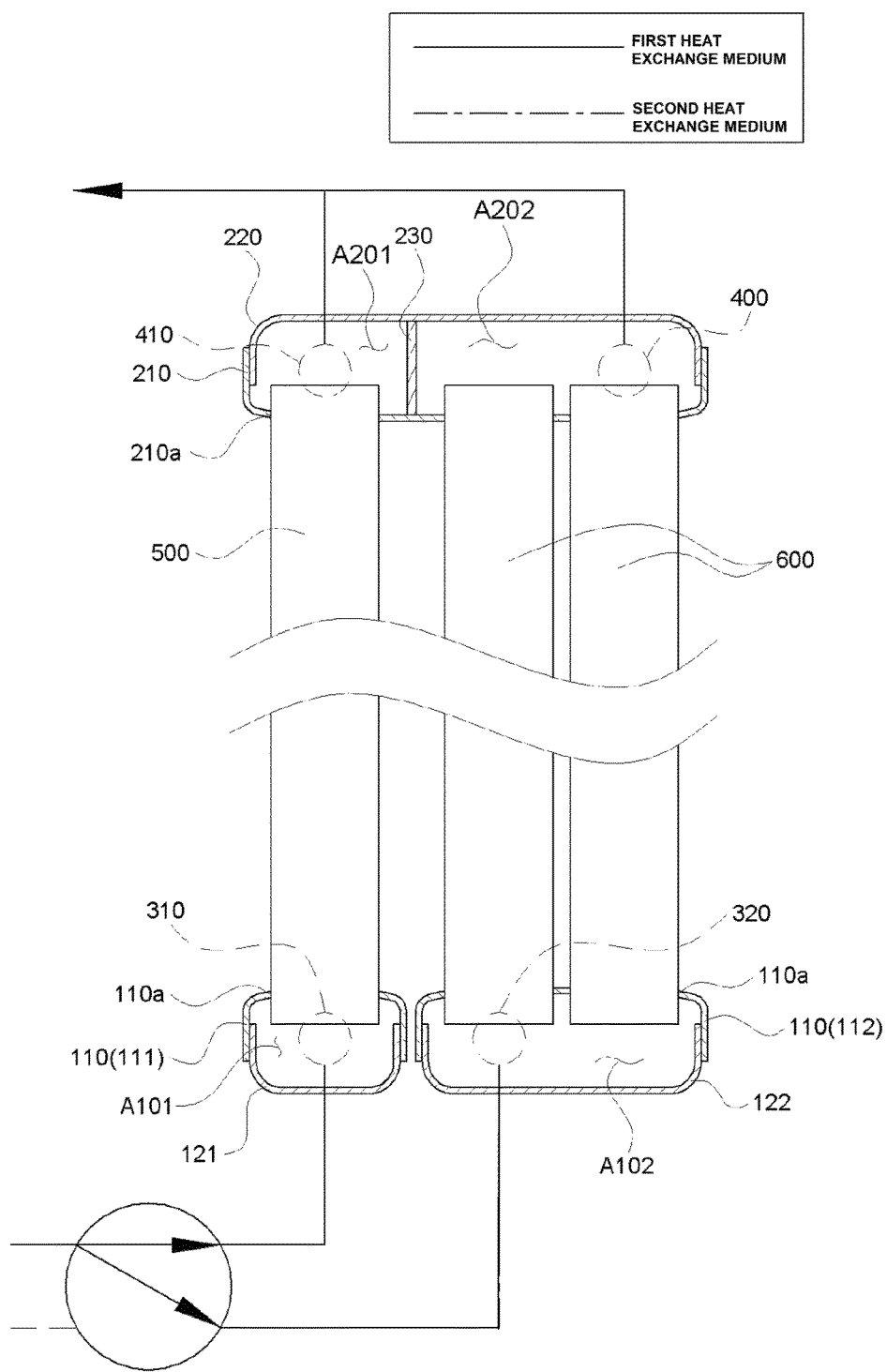
FIGS. 10 to 12 are diagrams illustrating flows of coolants (a first heat exchange medium or a second heat exchange medium) in the heat exchanger during cooling, heating, and dehumidification cooling according to the present invention, respectively.
Figure 11:
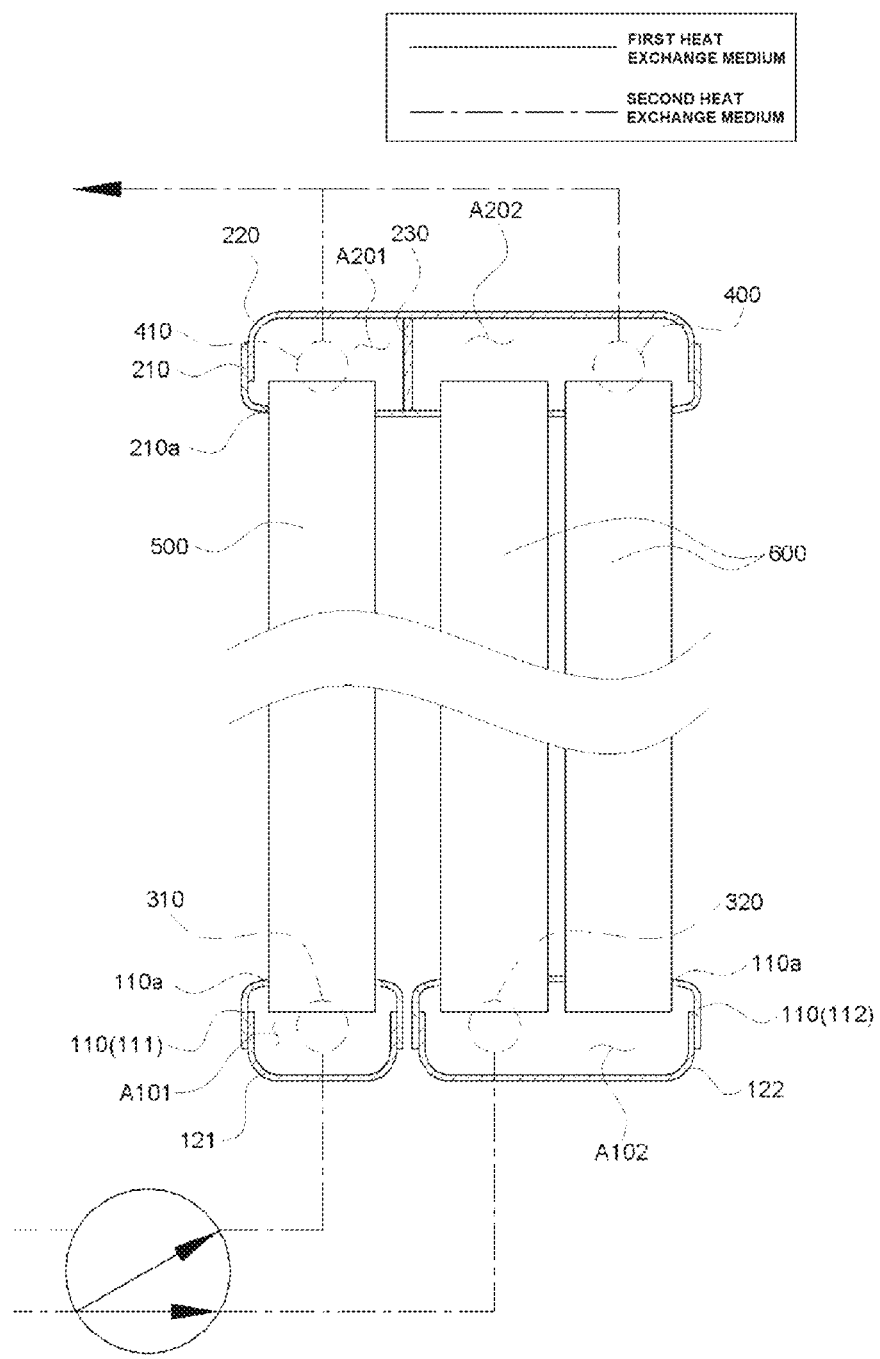
Figure 12:
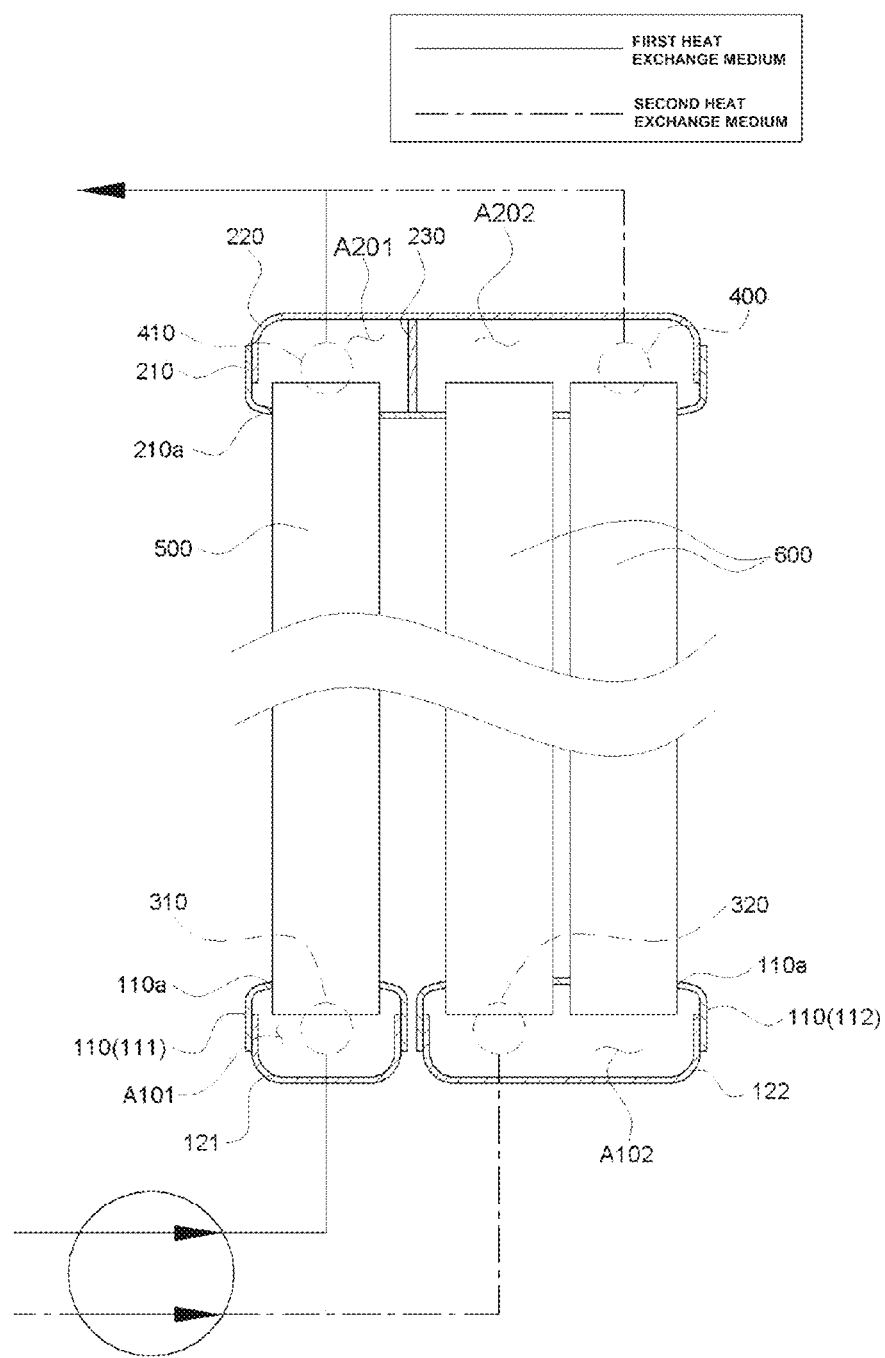
Figure 17:
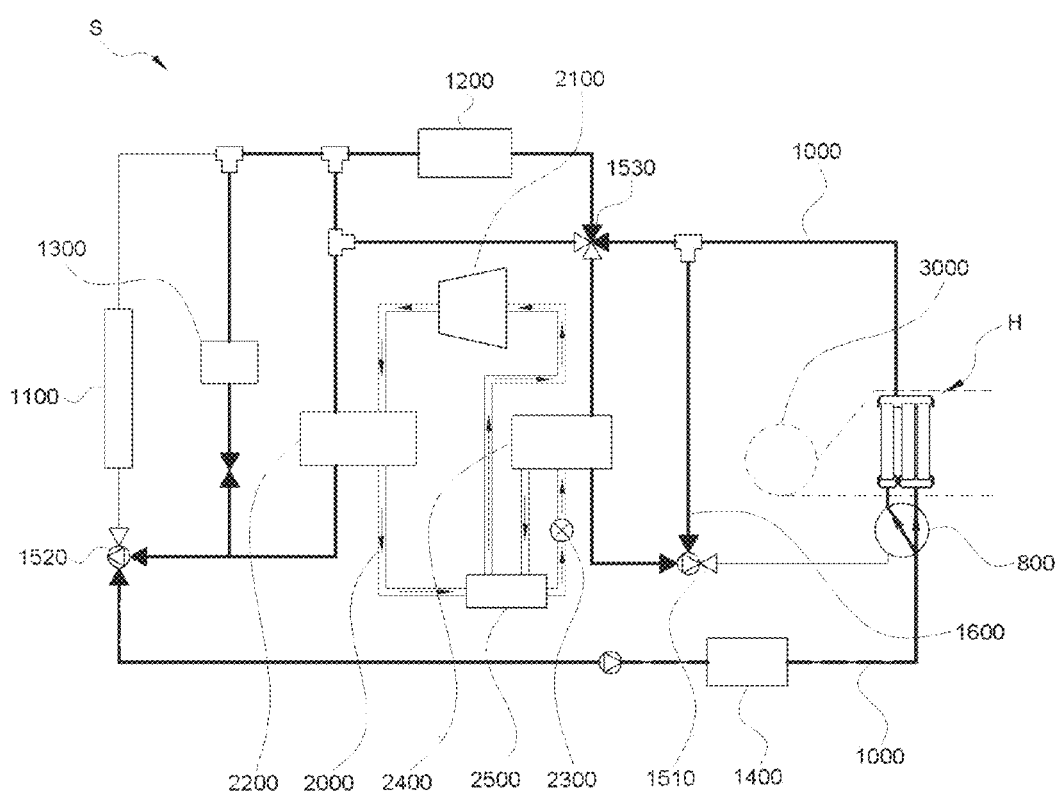
Figure 18:
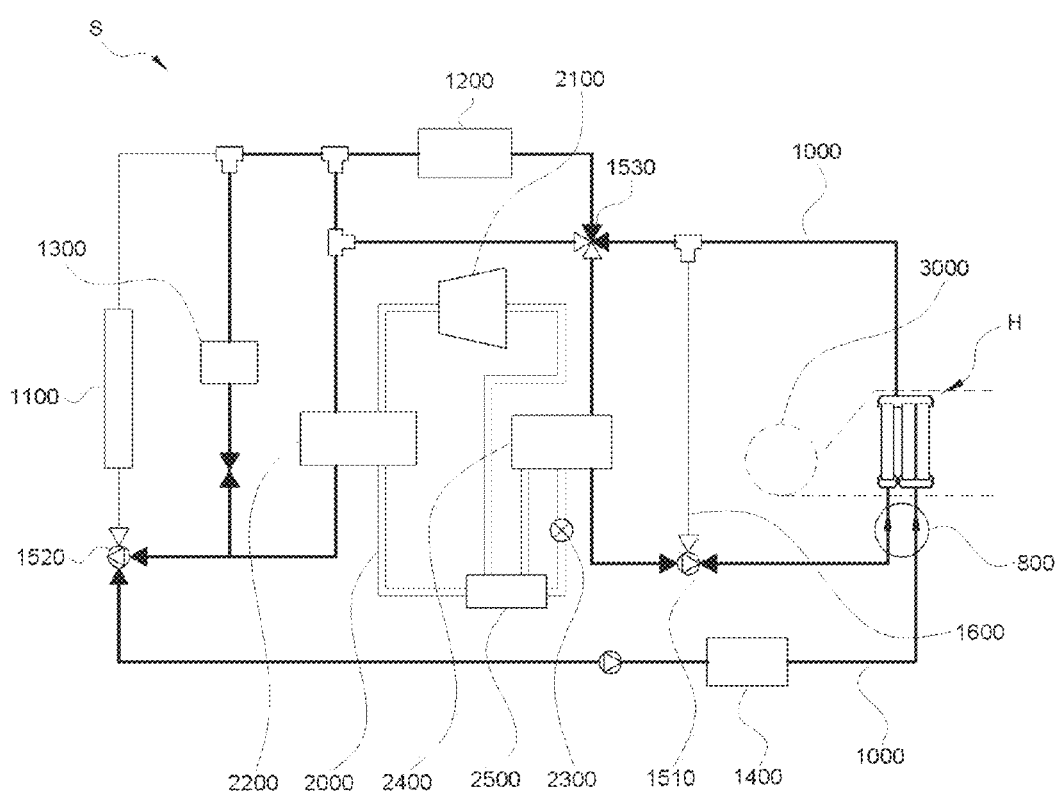
Figure 19:
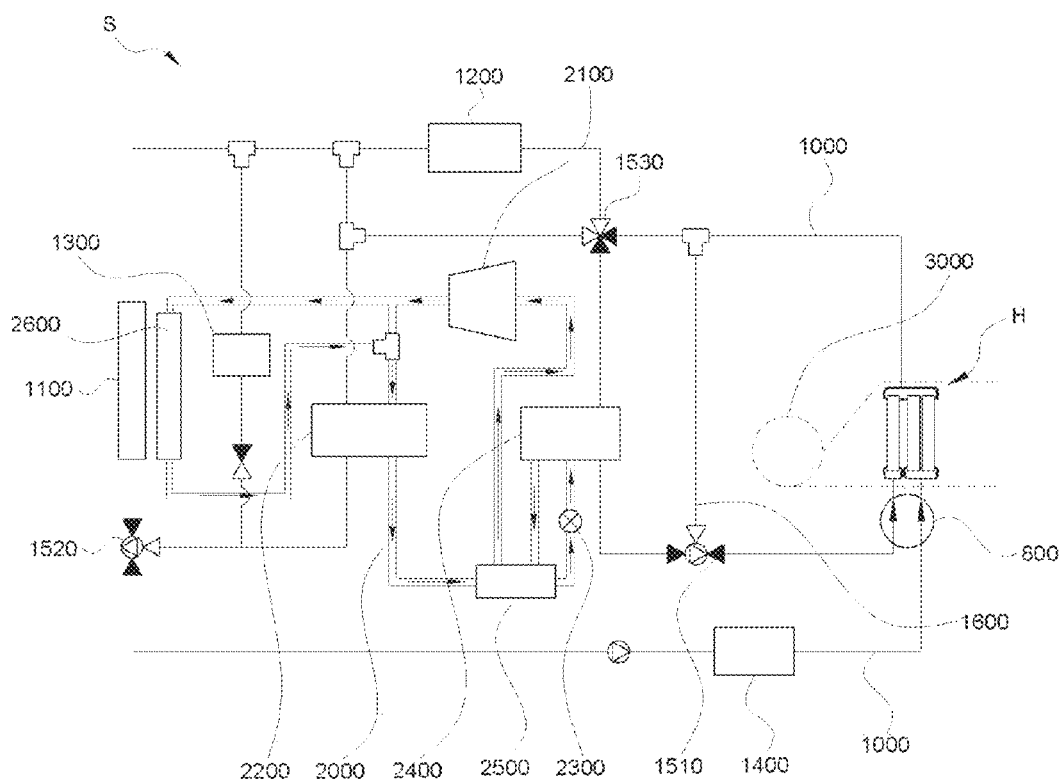
FIG. 19 is a diagram illustrating another example of the vehicle air conditioning system of the present invention.

FIG. 2 is a schematic diagram illustrating the vehicle air conditioning system S of the present invention, FIG. 3 is a system diagram illustrating the vehicle air conditioning system S of the present invention, FIGS. 4 and 5 are a perspective view and a cross-sectional view in an AA' direction of the heat exchanger H of the present invention, respectively, FIGS. 6 and 7 are another perspective view and a cross-sectional view in a BB' direction of the heat exchanger H of the present invention, respectively, FIGS. 8 and 9 are a perspective view and a partial cross-sectional view illustrating an example of a first header 110 of the heat exchanger H of the present invention, respectively, FIGS. 10 to 12 are diagrams illustrating flows of coolants (a first heat exchange medium or a second heat exchange medium) in the heat exchanger H during cooling, heating, and dehumidification cooling according to the present invention, respectively, FIGS. 13 to 18 are diagrams illustrating flows of coolants and refrigerants in various air conditioning conditions of the vehicle air conditioning system S of the present invention, and FIG. 19 is a diagram illustrating another example of the vehicle air conditioning system S of the present invention.

The vehicle air conditioning system S including the same of the present invention include a refrigerant loop and the heat exchanger H.

First, the heat exchanger H of the present invention, which is a component including a first heat exchange unit and a second heat exchange unit for cooling or heating air for air conditioning to air-condition the interior of a vehicle, includes a first header tank 100, a second header tank 200, first tubes 500, second tubes 600, a first inlet pipe 310, and a second inlet pipe 320.

The first header tank 100 is a part partitioned into a 1-1st area A101 and a 1-2nd area A102 inside, and the first inlet pipe 310 and the second inlet pipe 320 are connected to the 1-1st area A101 and the 1-2nd area A102, respectively.

In this case, the first header tank 100 is preferably provided on a lower side of the heat exchanger H to have a structure in which condensed water generated on a surface of the heat exchanger H when a first heat exchange medium having a low temperature flows inside the heat exchanger H is transferred to the lower side of the heat exchanger H for drainage.

First, in an example of the first header tank 100 illustrated in FIGS. 4 to 7, the 1-1st area A101 is formed by a 1-1st header 111 and a 1-1st tank 121, and the 1-2nd area A102 is formed by a 1-2nd header 112 and a 1-2nd tank 122. The 1-1st header 111 is hollowed to have first tube insertion holes 110a through which the first tubes 500 communicating with the 1-1st area A101 are inserted, and the 1-2nd header 112 is hollowed to have first tube insertion holes 110a through which the second tubes 600 communicating with the 1-2nd area A102 are inserted. In this exemplary embodiment, an assembly including the 1-1st header 111 and the 1-1st tank 121 and an assembly including the 1-2nd header 112 and the 1-2nd tank 122 are preferably spaced apart from each other at a predetermined distance, so that the condensed water is drained through a space therebetween.

In addition, in an example illustrated in FIGS. 8 and 9, the first header tank 100 is formed by coupling the 1-1st tank 121 and the 1-2nd tank 122 to one first header 110. The first header 110 has first tube insertion holes 110a formed to insert the first tubes 500 communicating with the 1-1st area A101 and the second tubes 600 communicating with the 1-2nd area A102 therein. In this case, the first header 110 is coupled to the 1-1st tank 121 and the 1-2nd tank 122 to form the 1-1st area A101 and the 1-2nd area A102, respectively. Further, the first header 110 is hollowed between the first tube insertion holes 110a into which the first tubes 500 are inserted and the first tube insertion holes 110a into which the second tubes 600 are inserted to have drainage holes 110b for drainage.

The second header tank 200 is a component spaced apart from the first header tank 100 at a predetermined distance in a height direction in parallel, and has a second area inside as a space in which the first heat exchange medium and the second heat exchange medium flow. The second header tank 200 may be formed by assembling a second header 210 and a second tank 220 together. In this case, in an example illustrated in FIGS. 4 and 5, a single second area is formed inside the second header tank 200, such that the first heat exchange medium transferred through the first tubes 500 and the second heat exchange medium transferred through the second tubes 600 are mixed in the second area inside the second header tank 200 and discharged through a single outlet pipe 400. In the heat exchanger H of the present invention, the first heat exchange medium and the second heat exchange medium are coolants, and may be mixed in different temperature states. That is, as illustrated in FIGS.

4 and 5, the coolant passing through the 1-1st area A101 of the first header tank 100 and the first tubes 500 and the coolant passing through the 1-2nd area A102 of the first header tank 100 and the second tubes 600 are mixed with each other in the second area of the second header tank 200 and then discharged through the outlet pipe 400.

Meanwhile, in the present invention, the first heat exchange medium is defined as a low-temperature coolant for cooling air for air conditioning, and the second heat exchange medium is defined as a high-temperature coolant for heating air for air conditioning, the second heat exchange medium having a higher temperature than the first heat exchange medium.

In an example illustrated in FIGS. 6 and 7, a baffle 230 is provided inside the second header tank 200, such that the second area includes a 2-1st area A201 communicating with the first tubes 500 and a 2-2nd area A202 communicating with the second tubes 600. In this case, the outlet pipe 400 may include a first outlet pipe 410 communicating with the 1-1st area A101 of the first header tank 100 or the 2-1st area A201 of the second header tank 200, and a second outlet pipe 420 communicating with the 1-2nd area A102 of the first header tank 100 or the 2-2nd area A202 of the second header tank 200. In the example illustrated in FIGS. 6 and 7, the first outlet pipe 410 and the second outlet pipe 420 are formed in parallel to communicate with the 2-1st area A201 and the 2-2nd area A202 of the second header tank 200, respectively.

The first tubes 500 are parts each having both ends fixed to the first header tank 100 and the second header tank 200, respectively, such that the first heat exchange medium or the second heat exchange medium flows therein to exchange heat with external air, and communicate with the 1-1st area A101 of the first header tank 100. In this case, the first tubes 500 are preferably positioned on a front side in a direction in which the air for air conditioning flows in order to increase drainage, with no fins 700 interposed therebetween.

In addition, the second tubes 600 are parts each having both ends fixed to the first header tank 100 and the second header tank 200, respectively, such that the first heat exchange medium or the second heat exchange medium flows therein to exchange heat with external air, and communicate with the 1-2nd area A102 of the first header tank 100. Fins 700 may be interposed between the second tubes 600.

The first inlet pipe 310 is connected to the 1-1st area A101 of the first header tank 100, and the second inlet pipe 320 is formed in the 1-2nd area A102 of the first header tank 100.

That is, the heat exchanger H includes a first heat exchange unit formed by the 1-1st area A101 of the first header tank 100, the first tubes 500, and a partial area of the second header tank 200, and a second heat exchange unit formed by the 1-2nd area A102 of the first header tank 100, the second tubes 600, and the remaining area of the second header tank 200.

The supply valve 800 is a means for regulating the flows of the first heat exchange medium and the second heat exchange medium supplied through the first inlet pipe 310 and the second inlet pipe 320. More specifically, the regulation through the supply valve 800 makes it possible to supply the first heat exchange medium to both the first inlet pipe 310 and the second inlet pipe 320, supply the second heat exchange medium to both the first inlet pipe 310 and the second inlet pipe 320, or supply the first heat exchange medium and the second heat exchange medium to the first inlet pipe 310 and the second inlet pipe 320, respectively.

More specifically, in order to perform cooling to the maximum, as illustrated in FIG. 10, the first heat exchange medium, which is a low-temperature coolant, is supplied to the first header tank 100 through the first inlet pipe 310 and the second inlet pipe 320, and passes through the first tubes 500 and the second tubes 600. Thereafter, the first heat exchange medium is discharged through the second header tank 200 and the outlet pipe 400.

In addition, in order to perform heating to the maximum, as illustrated in FIG. 11, the second heat exchange medium, which is a high-temperature coolant, is supplied to the first header tank 100 through the first inlet pipe 310 and the second inlet pipe 320, and passes through the first tubes 500 and the second tubes 600. Thereafter, the second heat exchange medium is discharged through the second header tank 200 and the outlet pipe 400.

In addition, in order to perform dehumidification cooling, as illustrated in FIG. 12, the first heat exchange medium, which is a low-temperature coolant, is supplied to the 1-1st area A101 of the first header tank 100 through the first inlet pipe 310, and passes through the first tubes 500. Thereafter, the first heat exchange medium is discharged through the second header tank 200 and the outlet pipe 400. Also, the second heat exchange medium, which is a high-temperature coolant, is supplied to the 1-2nd area A102 of the first header tank 100 through the second inlet pipe 320, and passes through the second tubes 600. Thereafter, the second heat exchange medium is discharged through the second header tank 200 and the outlet pipe 400.

The vehicle air conditioning system S of the presently claimed invention may include a blowing unit 3000 configured to blow air for air conditioning into the interior of the vehicle, with the above-described heat exchanger H provided in an air conditioning case 4000. That is, the heat exchanger H may be controlled, depending on how the supply valve 800 is operated, such that the first heat exchange medium having a low temperature is supplied through the first inlet pipe 310 and the second inlet pipe 320 to cool the air for air conditioning, the second heat exchange medium having a high temperature is supplied through the first inlet pipe 310 and the second inlet pipe 320 to heat the air for air conditioning, or the first heat exchange medium having a low temperature is supplied through the first inlet pipe 310 and the second heat exchange medium having a high temperature is supplied through the second inlet pipe 320 to dehumidification-cool the air for air conditioning. Accordingly, the heat exchanger H and the vehicle air conditioning system S of the presently claimed invention can easily air-condition the interior of the vehicle even in a simple structure in which a single heat exchanger H is provided.

In addition, the supply valve 800 regulates the supply of the cooled first heat exchange medium and the heated second heat exchange medium. In the vehicle air conditioning system S of the present invention, a means (cooling unit) for cooling the first heat exchange medium and a means (heating unit) for heating the second heat exchange medium may be formed in various forms.

First, an evaporator 2400 for the refrigerant loop may be used as the means for cooling the first heat exchange medium for indoor cooling, and a condenser 2200 for the refrigerant loop may be used as the means for indoor heating.

More specifically, while the refrigerant loop circulates a compressor 2100, a condenser 2200, an expansion means 2300, and an evaporator 2400 along a refrigerant circulation line 2000, the compressor 2100 compresses the refrigerant and delivers the compressed refrigerant, the condenser 2200 radiates heat by condensing the high-pressure refrigerant delivered from the compressor 2100, the expansion means 2300 throttles the condensed and liquefied refrigerant, and the evaporator 2400 absorbs heat by evaporating the throttled low-pressure liquid-phase refrigerant. That is, in the vehicle air conditioning system S of the present invention, while the refrigerant circulates along the refrigerant circulation line 2000, the evaporator 2400 is used as a cooling unit for cooling the coolant (first heat exchange medium) by exchanging heat between the liquid-phase refrigerant therein and the coolant, and the condenser 2200 is used as a heating unit for heating the coolant by exchanging heat between the refrigerant therein and the coolant.

Meanwhile, the vehicle air conditioning system S of the present invention may further include an internal heat exchanger 2500 in which heat is exchanged between the refrigerant before passing through the expansion means 2300 and the refrigerant after passing through the evaporator 2400 on the refrigerant circulation line 2000, and an air-cooled condenser 2600 between the compressor 2100 and the condenser 2200. The example of the vehicle air conditioning system S of the present invention including the air-cooled condenser 2600 is illustrated in FIG. 19. The air-cooled condenser 2600 may be provided in parallel with the radiator 1100 in an air inflow direction.

In this case, the vehicle air conditioning system S of the present invention includes a first regulation valve 1510 and a second regulation valve 1520 for regulating the flow of the coolant. The first regulation valve 1510 is provided on a coolant circulation line 1000 between the evaporator 2400 and the supply valve 800 to regulate the supply of the low-temperature coolant passing through the evaporator 2400 to the supply valve 800. Also, the second regulation valve 1520 is provided on the coolant circulation line 1000 between the condenser 2200 and the supply valve 800 to regulate the supply of the high-temperature coolant passing through the condenser 2200 to the supply valve 800.

In addition, the vehicle air conditioning system S of the present invention may further include a battery module 1200 and an electric component 1300, which may be heated or cooled by the coolant whose temperature is regulated by the condenser 2200 and the evaporator 2400 described above. In some situations, heat generated from the battery module 1200 and the electric component 1300 may be used as the heating unit. In this case, the flow of the coolant passing through the battery module 1200 and the electric component 1300 may be regulated by a third regulation valve 1530.

In an example illustrated in FIG. 3, the third regulation valve 1530 is connected to the coolant circulation line 1000 on a side to be connected to the battery module 1200, a side bypassing the battery module 1200, the condenser 2200, and the heat exchanger H to regulate the flow of the coolant.

In addition, the vehicle air conditioning system S of the present invention may include a radiator 1100 to regulate the temperature of the coolant. The radiator 1100, which is a component for radiating heat of the coolant flowing inside using air blown by a fan (not illustrated), is provided to properly regulate temperatures of the battery and the electric component 1300. In this case, the flow of the coolant passing through the radiator 1100 may be regulated by the second regulation valve 1520. More specifically, in the example illustrated in FIG. 3, the second regulation valve 1520 may be connected to the coolant circulation line 1000 on a side to be connected to the condenser 2200, the radiator 1100, and the supply valve 800 to regulate the flow of the coolant.

Furthermore, the vehicle air conditioning system S of the present invention may further include a bypass line 1600 connecting the first regulation valve 1510 to the coolant circulation line 1000, so that the coolant passing through the evaporator 2400 is bypassed without passing through the integrated heat exchange medium in a situation where the battery module 1200 needs to be cooled quickly. In this case, the first regulation valve 1510 may be connected to the coolant circulation line 1000 on a side to be connected to the evaporator 2400, the supply valve 800, and the bypass line 1600 to regulate the flow of the coolant.

As described above, since the vehicle air conditioning system S of the present invention is capable of supplying the coolant to the supply valve 800 after being cooled or heated in accordance with various vehicle situations, air for air conditioning can be easily cooled or heated or dehumidification heating can be performed, the battery module 1200 and the electric component 1300 can be properly cooled or heated, and various kinds of air conditioning can be performed. Specific examples of the various kinds of air conditioning will be explained with reference to FIGS. 13 to 18. In FIGS. 13 to 18, both the flows of the first heat exchange medium and the second heat exchange medium are indicated by solid lines because the first heat exchange medium and the second heat exchange medium are mixed in some sections.

Figure 13:
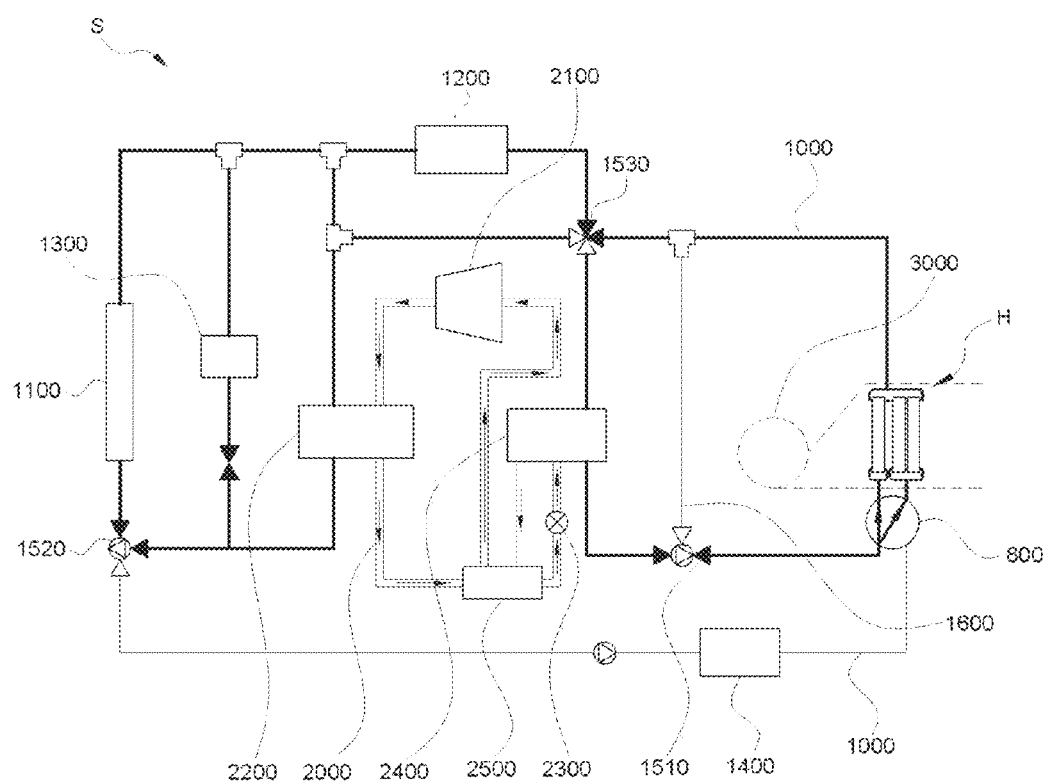
FIGS. 13 to 18 are diagrams illustrating flows of coolants and refrigerants in various air conditioning conditions of the vehicle air conditioning system of the present invention.

First, in an example illustrated in FIG. 13, the battery module 1200 and the electric component 1300 can be cooled together with the cooling of the interior of the vehicle. Here, the flow of the coolant is indicated in bold. More specifically, the coolant cooled while passing through the evaporator 2400 is supplied to both the first heat exchange unit and the second heat exchange unit of the heat exchanger H through the supply valve 800 to cool air for air conditioning, such that cooling is performed. In addition, the coolant cooled while passing through the evaporator 2400 and cooled while passing through the radiator 1100 cools the battery module 1200 and the electric component 1300 while passing therethrough.

Figure 14:
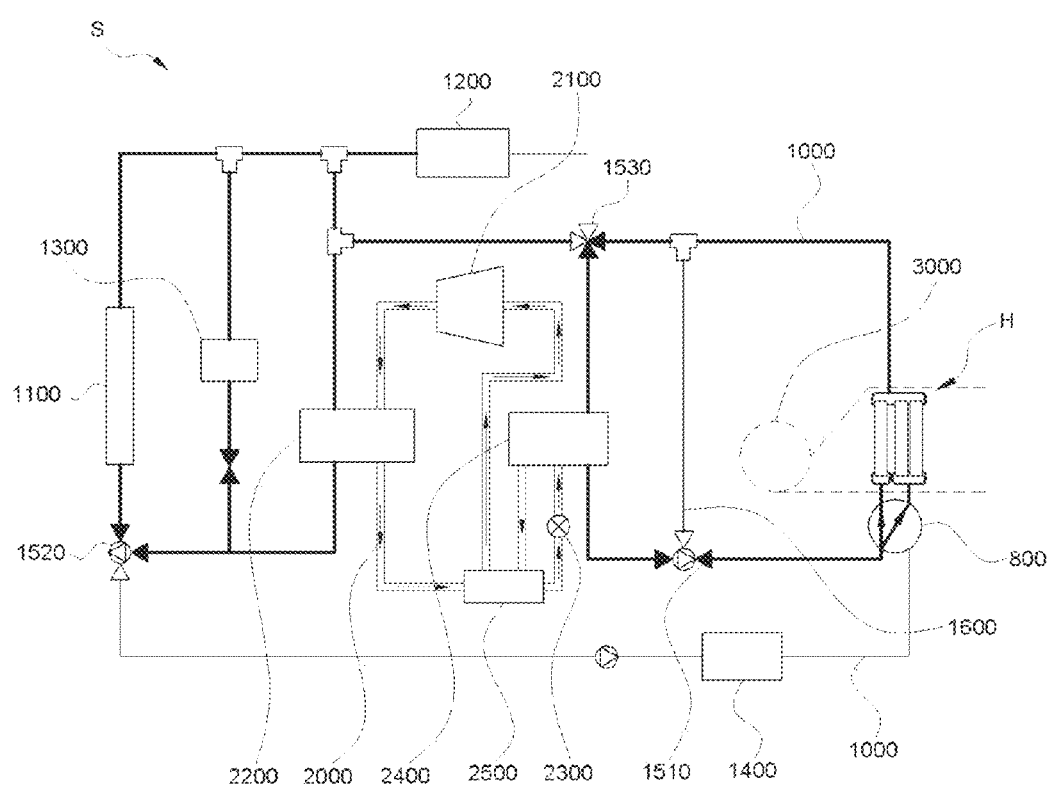

In an example illustrated in FIG. 14, only the electric component 1300 is cooled together with the cooling of the interior of the vehicle. Here, the flow of the coolant is indicated in bold. The coolant cooled while passing through the evaporator 2400 is supplied to both the first heat exchange unit and the second heat exchange unit of the heat exchanger H through the supply valve 800 to cool air for air conditioning, such that cooling is performed. In this case, by regulating the third regulation valve 1530, the low-temperature coolant cools only the electric component 1300 while passing therethrough without passing through the battery module 1200 as illustrated in FIG. 14.

Figure 15:
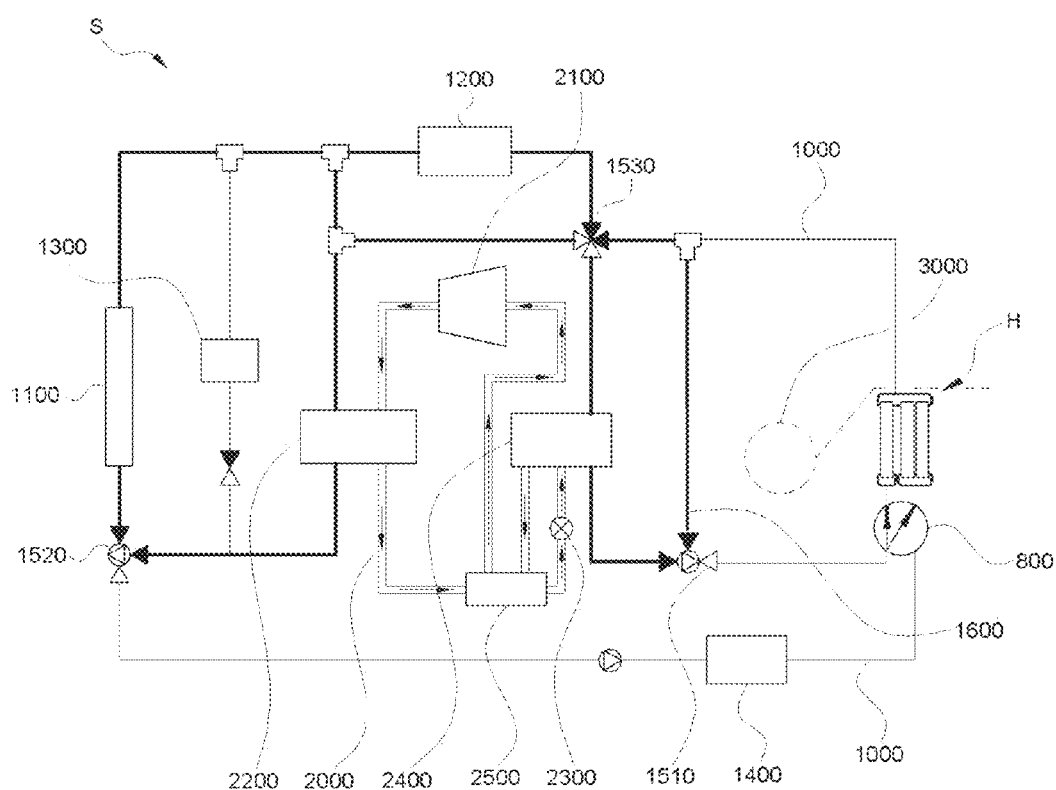

In an example illustrated in FIG. 15, where quick cooling of the battery module 1200 is required, the flow of the coolant is indicated in bold. The coolant cooled while passing through the evaporator 2400 cools the battery module 1200 while passing therethrough via the bypass line 1600 and the third regulation valve 1530, without being supplied to the supply valve 800 by regulating the first regulation valve 1510. In this case, the radiator 1100 also cools the coolant, together with the evaporator 2400, while the coolant circulates to exchange heat.

Figure 16:
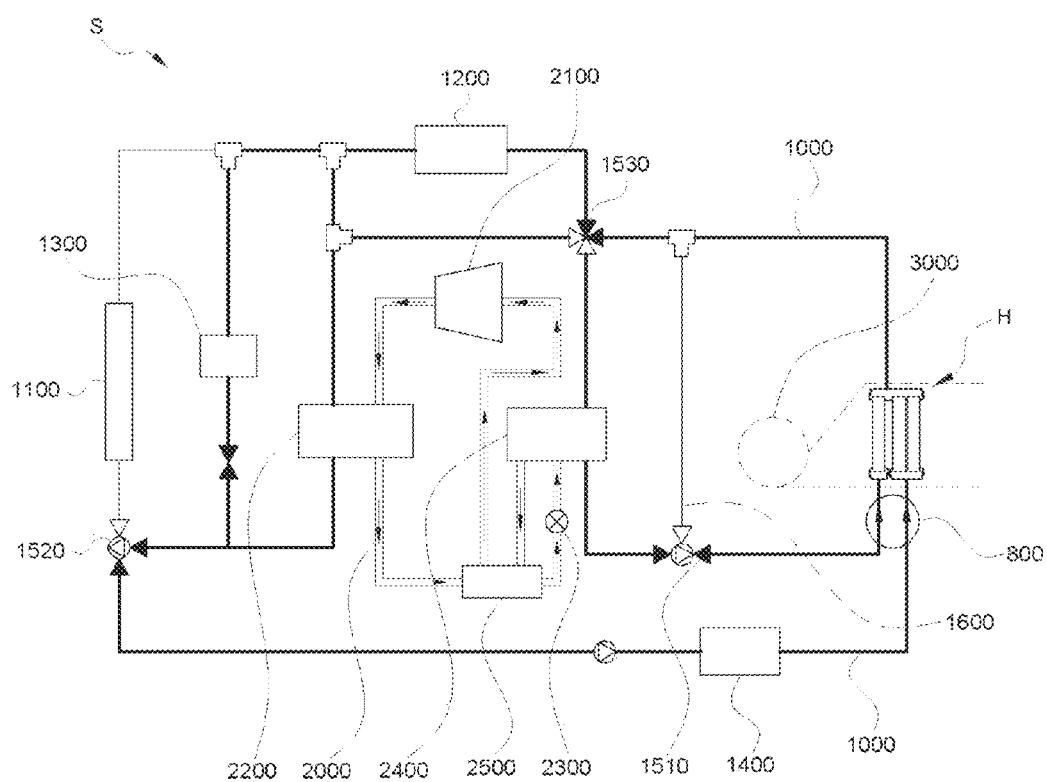

FIG. 16 illustrates a state in which dehumidification can be performed as a mixed mode state. The coolant passing through the evaporator 2400 and the coolant passing through the condenser 2200 are supplied to the first heat exchange unit and the second heat exchange unit of the heat exchanger H through the supply valve 800, respectively, to remove moisture from air for air conditioning. Thereafter, the moisture-removed air is supplied to the interior of the vehicle after its temperature is regulated (heated).

In an example illustrated in FIG. 17, the battery module 1200 and the electric component 1300 are heated together with heating. The coolant heated while passing through the condenser 2200 heats the battery module 1200 and the electric component 1300 while passing therethrough, and is supplied to both the first heat exchange unit and the second heat exchange unit of the heat exchanger H through the supply valve 800 to heat air for air conditioning, such that the interior of the vehicle is heated. In this case, the refrigerant passing through the evaporator 2400 is bypassed through the bypass line 1600, and the flow of the coolant is blocked by the second regulation valve 1520 so that the coolant is not cooled by the radiator 1100.

In an example illustrated in FIG. 18, the battery module 1200 and the electric component 1300 serve as the heating unit when a heating degree is low. That is, it is illustrated that the refrigerant does not circulate along the refrigerant circulation line 2000, and the coolant heated while passing through the battery module 1200 and the electric component 1300 is supplied to the heat exchanger H, such that heating is performed. In the example illustrated in FIG. 18, the coolant heated while passing through the battery module 1200 is transferred to the first heat exchange unit through the coolant circulation line 1000 communicating with the evaporator 2400. That is, it is illustrated that, in the flow of the coolant, the coolant heated by the battery module 1200 is supplied to the first heat exchange unit, and the coolant heated by the electric component 1300 is supplied to the second heat exchange unit by the second regulation valve 1520.

Additionally, although not illustrated, in the flow of the coolant, while the coolant circulation line 1000 communicating with the evaporator 2400 is closed, the coolant heated through the battery module 1200 and the electric component 1300 is transferred through the coolant circulation line 1000 located on the lower side of the drawing by regulating the second regulation valve 1520, supplied to both the first heat exchange unit and the second heat exchange unit, and then transferred back to the battery module 1200 and the electric component 1300.

In addition, the coolant cooled while passing through the evaporator 2400 and cooled while passing through the radiator 1100 cools the electric component 1300 while passing therethrough.

Meanwhile, a heater core 1400 illustrated as reference numeral 1400 may be provided on the coolant circulation line 1000 for the purpose of regulating a temperature of the battery module 1200.

That is, as described above, the vehicle air conditioning system S of the present invention is advantageous in that, through the supply valve 800, only the first heat exchange medium having a low temperature can be supplied to perform cooling, only the second heat exchange medium having a high temperature can be supplied to perform heating, or both the first heat exchange medium and the second heat exchange medium can be supplied to perform dehumidification cooling, and the battery module 1200 and the electric component 1300 can be selectively cooled or heated.

The present invention is not limited to the above-described exemplary embodiments, and may be applied in various forms. Various modifications may be made by any person having ordinary knowledge in the art to which the present invention pertains without departing from the gist of the present invention claimed in the claims.

The invention claimed is:

1. A heat exchanger comprising:
a first header tank partitioned into a 1-1st area and a 1-2nd area inside;
a second header tank spaced apart from the first header tank at a predetermined distance in parallel;
first tubes and second tubes each having both ends fixed to the first header tank and the second header tank, respectively, the first tubes communicating with the 1-1st area and the second tubes communicating with the 1-2nd area;
a supply valve for selectively supplying a first heat exchange medium and a second heat exchange medium to the 1-1st area and the 1-2nd area, respectively, wherein the first heat exchange medium or the second heat exchange medium diverges before supply;
a first inlet pipe provided between the 1-1st area of the first header tank and the supply valve;
a second inlet pipe provided between the 1-2nd area of the first header tank and the supply valve,
wherein through the supply valve, the first heat exchange medium is supplied to both the first inlet pipe and the second inlet pipe, the second heat exchange medium is supplied to both the first inlet pipe and the second inlet pipe, or the first heat exchange medium and the second heat exchange medium are supplied to the first inlet pipe and the second inlet pipe, respectively.

2. The heat exchanger of claim 1, wherein the first heat exchange medium and the second heat exchange medium are coolants that are mixable with each other, while having different temperatures.

3. The heat exchanger of claim 2, wherein the first header tank includes a 1-1st header and a 1-1st tank forming the 1-1st area, and a 1-2nd header and a 1-2nd tank forming the 1-2nd area.

4. The heat exchanger of claim 3, wherein an assembly including the 1-1st header and the 1-1st tank and an assembly including the 1-2nd header and the 1-2nd tank are spaced apart from each other at a predetermined distance.

5. A vehicle air conditioning system comprising:
an air conditioning case;
the heat exchanger of claim 4, the heat exchanger being provided in the air conditioning case; and
a blower configured to blow air to supply the air for air conditioning heat-exchanged while passing through the heat exchanger to the interior of a vehicle.

6. A vehicle air conditioning system comprising:
an air conditioning case;
the heat exchanger of claim 3, the heat exchanger being provided in the air conditioning case; and
a blower configured to blow air to supply the air for air conditioning heat-exchanged while passing through the heat exchanger to the interior of a vehicle.

7. The heat exchanger of claim 2, wherein the first header tank includes a first header, and a 1-1st tank and a 1-2nd tank coupled to the first header.

8. The heat exchanger of claim 7, wherein the first header tank is hollowed in a predetermined area thereof between first tube insertion holes into which the first tubes are inserted and first tube insertion holes into which the second tubes are inserted to form drainage holes through which condensed water generated on a surface is drained.

9. A vehicle air conditioning system comprising:
an air conditioning case;
the heat exchanger of claim 8, the heat exchanger being provided in the air conditioning case; and
a blower configured to blow air to supply the air for air conditioning heat-exchanged while passing through the heat exchanger to the interior of a vehicle.

10. A vehicle air conditioning system comprising:
an air conditioning case;
the heat exchanger of claim 7, the heat exchanger being provided in the air conditioning case; and
a blower configured to blow air to supply the air for air conditioning heat-exchanged while passing through the heat exchanger to the interior of a vehicle.

11. The heat exchanger of claim 2, further comprising an outlet pipe through which the first heat exchange medium or the second heat exchange medium flowing through the first tubes and the second tubes is discharged.

12. The heat exchanger of claim 11, wherein the second header tank is partitioned by a baffle inside, such that the second header tank includes a 2-1st area communicating with the first tubes and a 2-2nd area communicating with the second tubes.

13. The heat exchanger of claim 12, wherein the outlet pipe includes a first outlet pipe communicating with the 1-1st area or the 2-1st area, and a second outlet pipe communicating with the 1-2nd area or the 2-2nd area.

14. A vehicle air conditioning system comprising:
an air conditioning case;
the heat exchanger of claim 13, the heat exchanger being provided in the air conditioning case; and
a blower configured to blow air to supply the air for air conditioning heat-exchanged while passing through the heat exchanger to the interior of a vehicle.

15. A vehicle air conditioning system comprising:
an air conditioning case;
the heat exchanger of claim 12, the heat exchanger being provided in the air conditioning case; and
a blower configured to blow air to supply the air for air conditioning heat-exchanged while passing through the heat exchanger to the interior of a vehicle.

16. A vehicle air conditioning system comprising:
an air conditioning case;
the heat exchanger of claim 11, the heat exchanger being provided in the air conditioning case; and
a blower configured to blow air to supply the air for air conditioning heat-exchanged while passing through the heat exchanger to the interior of a vehicle.

17. The heat exchanger of claim 2, further comprising fins interposed between the second tubes.

18. A vehicle air conditioning system comprising:
an air conditioning case;
the heat exchanger of claim 17, the heat exchanger being provided in the air conditioning case; and
a blower configured to blow air to supply the air for air conditioning heat-exchanged while passing through the heat exchanger to the interior of a vehicle.

19. A vehicle air conditioning system comprising:
an air conditioning case;
the heat exchanger of claim 1, the heat exchanger being provided in the air conditioning case; and
a blower configured to blow air to supply the air for air conditioning heat-exchanged while passing through the heat exchanger to the interior of a vehicle.

20. The vehicle air conditioning system of claim 19, wherein in the heat exchanger,
the first heat exchange medium having a first temperature is supplied through the first inlet pipe and the second inlet pipe to cool the air for air conditioning,
the second heat exchange medium having a second temperature that is higher than the first temperature is supplied through the first inlet pipe and the second inlet pipe to heat the air for air conditioning, or
the first heat exchange medium is supplied through the first inlet pipe and the second heat exchange medium is supplied through the second inlet pipe to dehumidification-cool the air for air conditioning.

21. A vehicle air conditioning system comprising:
an air conditioning case;
the heat exchanger of claim 2, the heat exchanger being provided in the air conditioning case; and
a blower configured to blow air to supply the air for air conditioning heat-exchanged while passing through the heat exchanger to the interior of a vehicle.

22. A vehicle air conditioning system comprising:
a refrigerant loop including a condenser and an evaporator; and
a heat exchanger in which one or both of a first heat exchange medium and a second heat exchange medium selectively flow, the first heat exchange medium being cooled by exchanging heat with a refrigerant through the evaporator for indoor cooling, and the second heat exchange medium being heated by exchanging heat with the refrigerant through the condenser for indoor heating.

23. The vehicle air conditioning system of claim 22, wherein the heat exchanger includes:
a first heat exchange unit and a second heat exchange unit;
a first inlet pipe connected to the first heat exchange unit;
a second inlet pipe connected to the second heat exchange unit; and
a supply valve regulating flows of the first heat exchange medium and the second heat exchange medium supplied through the first inlet pipe and the second inlet pipe, and
through the supply valve, the first heat exchange medium is supplied to both the first inlet pipe and the second inlet pipe, the second heat exchange medium is supplied to both the first inlet pipe and the second inlet pipe, or the first heat exchange medium and the second heat exchange medium are supplied to the first inlet pipe and the second inlet pipe, respectively.

24. The vehicle air conditioning system of claim 23, wherein the first heat exchange medium and the second heat exchange medium are transferred along a coolant circulation line, and the refrigerant loop circulates a compressor, the condenser, an expansion means, and the evaporator along a refrigerant circulation line.

25. The vehicle air conditioning system of claim 24, further comprising a first regulation valve provided on the coolant circulation line between the evaporator and the supply valve to regulate a flow of a coolant.

26. The vehicle air conditioning system of claim 25, further comprising a second regulation valve provided on the refrigerant circulation line between the condenser and the supply valve to regulate the flow of the coolant.

27. The vehicle air conditioning system of claim 26, further comprising a battery module provided on the coolant circulation line,
wherein the second heat exchange medium is heated by the battery module.

28. The vehicle air conditioning system of claim 27, further comprising a third regulation valve provided on the coolant circulation line between the battery module and the evaporator to regulate the flow of the coolant.

29. The vehicle air conditioning system of claim 28, further comprising an electric component provided on the coolant circulation line,
  wherein the second heat exchange medium is heated by the electric component.

30. The vehicle air conditioning system of claim 29, further comprising a radiator provided on the coolant circulation line.

31. The vehicle air conditioning system of claim 25, further comprising a bypass line connecting the first regulation valve to the coolant circulation line, so that the coolant passing through the evaporator is bypassed without passing through the integrated heat exchange medium.

32. The vehicle air conditioning system of claim 31, wherein the refrigerant loop includes an air-cooled condenser.

* * * * *